US012697707B2

(12) United States Patent
Stanke et al.

(10) Patent No.: US 12,697,707 B2
(45) Date of Patent: Aug. 4, 2026

(54) TRIGGER MECHANISM FOR POWER TOOL

(71) Applicant: MILWAUKEE ELECTRIC TOOL CORPORATION, Brookfield, WI (US)

(72) Inventors: Zachary G. Stanke, Wausau, WI (US); Daniel M. Blau, Milwaukee, WI (US); Gareth Mueckl, Milwaukee, WI (US); Levi D. Speckman, Elkhorn, WI (US); Carter H. Ypma, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 5 days.

(21) Appl. No.: 18/463,622

(22) Filed: Sep. 8, 2023

(65) Prior Publication Data

US 2024/0083008 A1 Mar. 14, 2024

Related U.S. Application Data

(60) Provisional application No. 63/405,087, filed on Sep. 9, 2022.

(51) Int. Cl.
*B25F 5/02* (2006.01)

(52) U.S. Cl.
CPC .................................... *B25F 5/02* (2013.01)

(58) Field of Classification Search
None
See application file for complete search history.

(56) References Cited

U.S. PATENT DOCUMENTS

| | | | | |
|---|---|---|---|---|
| 4,820,962 | A | 4/1989 | Millauer | |
| 4,830,549 | A | 5/1989 | Neumaier et al. | |
| 5,014,793 | A * | 5/1991 | Germanton | H02P 1/18 81/473 |
| 5,235,261 | A | 8/1993 | Philipp | |
| 5,365,155 | A | 11/1994 | Zimmermann | |
| 5,847,908 | A | 12/1998 | Herbstritt | |
| 6,658,829 | B2 | 12/2003 | Kobayashi et al. | |
| 6,891,457 | B2 | 5/2005 | Sako | |
| 6,933,689 | B2 | 8/2005 | Yamamoto | |
| 7,053,567 | B2 | 5/2006 | Yamamoto | |
| 7,076,830 | B2 | 7/2006 | Conner et al. | |
| 7,090,030 | B2 | 8/2006 | Miller | |
| 7,174,972 | B2 | 2/2007 | Kristen et al. | |
| 7,210,541 | B2 | 5/2007 | Miller | |

(Continued)

FOREIGN PATENT DOCUMENTS

| | | |
|---|---|---|
| CN | 103534067 A | 1/2014 |
| CN | 104541737 A | 4/2015 |

(Continued)

*Primary Examiner* — Tanzim Imam
(74) *Attorney, Agent, or Firm* — Michael Best & Friedrich LLP

(57) ABSTRACT

A power tool including a housing, a motor, a controller, and a trigger mechanism. The housing includes a handle housing portion and a motor housing portion. The motor is supported within the motor housing portion. The controller is disposed in the housing and is configured to control operation of the motor. The trigger mechanism is coupled to the handle housing portion. The trigger mechanism includes a trigger contact body and a sensor configured to detect a force applied on the trigger contact body and transmit a signal to the controller to energize the motor.

19 Claims, 9 Drawing Sheets

(56) References Cited

U.S. PATENT DOCUMENTS

| | | | |
|---|---|---|---|
| 7,242,390 | B2 | 7/2007 | Bader et al. |
| 7,359,628 | B2 * | 4/2008 | Broghammer ............ B25F 5/02 200/522 |
| 7,411,144 | B2 * | 8/2008 | Broghammer ...... H01M 50/202 200/332.2 |
| 7,732,747 | B2 | 6/2010 | Wieler et al. |
| 7,868,263 | B2 | 1/2011 | Hammerstingl et al. |
| 8,011,441 | B2 | 9/2011 | Leimbach et al. |
| 8,011,547 | B2 | 9/2011 | Leimbach et al. |
| 8,210,273 | B2 | 7/2012 | Suzuki et al. |
| 8,230,941 | B2 | 7/2012 | Leimbach et al. |
| 8,261,642 | B2 | 9/2012 | Brandstrom et al. |
| 8,267,296 | B2 | 9/2012 | Leimbach et al. |
| 8,267,297 | B2 | 9/2012 | Leimbach et al. |
| 8,286,722 | B2 | 10/2012 | Leimbach et al. |
| 8,387,718 | B2 | 3/2013 | Leimbach et al. |
| 8,587,230 | B2 | 11/2013 | Pant et al. |
| 8,587,231 | B2 | 11/2013 | Pant |
| 8,602,282 | B2 | 12/2013 | Leimbach et al. |
| 8,616,300 | B2 | 12/2013 | Suzuki et al. |
| 8,636,079 | B2 | 1/2014 | Totsu |
| 8,657,032 | B2 | 2/2014 | Numata |
| 8,689,901 | B2 | 4/2014 | Chen |
| 8,763,874 | B2 | 7/2014 | McCardle et al. |
| 8,810,085 | B2 | 8/2014 | Matsunaga et al. |
| 8,813,370 | B2 | 8/2014 | Pellenc |
| 8,833,221 | B2 | 9/2014 | Tomita et al. |
| 8,833,234 | B2 | 9/2014 | Gronau et al. |
| 8,856,555 | B2 | 10/2014 | Heydron et al. |
| 8,875,804 | B2 | 11/2014 | Puzio et al. |
| 8,995,907 | B2 | 3/2015 | Joseph |
| 9,415,488 | B2 | 8/2016 | Puzio et al. |
| 9,450,471 | B2 | 9/2016 | Mergener et al. |
| 9,451,976 | B2 | 9/2016 | Schneider et al. |
| 9,563,219 | B2 | 2/2017 | Heydron et al. |
| 9,654,050 | B2 | 5/2017 | Kokinelis et al. |
| 9,676,088 | B2 | 6/2017 | Leimbach et al. |
| 9,706,706 | B2 | 7/2017 | Barendrecht |
| 9,774,229 | B1 | 9/2017 | Mergener et al. |
| 9,954,417 | B2 | 4/2018 | Mergener et al. |
| 9,960,656 | B2 | 5/2018 | Mergener et al. |
| 10,240,881 | B1 | 3/2019 | Galie et al. |
| 10,414,436 | B1 | 9/2019 | Bonny |
| 11,172,604 | B2 | 11/2021 | Yang et al. |
| 2004/0206519 | A1 | 10/2004 | Kristen et al. |
| 2007/0144753 | A1 | 6/2007 | Miller |
| 2008/0053805 | A1 | 3/2008 | Wanek |
| 2009/0173510 | A1 | 7/2009 | Milbourne et al. |
| 2009/0308628 | A1 | 12/2009 | Totsu |
| 2010/0326804 | A1 | 12/2010 | Saur |
| 2011/0291777 | A1 | 12/2011 | Stiltz et al. |
| 2012/0162847 | A1 | 6/2012 | Suzuki et al. |
| 2012/0312573 | A1 | 12/2012 | Yanagihara |
| 2013/0046448 | A1 | 2/2013 | Fan et al. |
| 2013/0255981 | A1 * | 10/2013 | Noto ....................... B25F 5/008 173/217 |
| 2013/0256274 | A1 | 10/2013 | Faulkner |
| 2013/0292147 | A1 * | 11/2013 | Mergener ................ B25B 21/00 173/20 |
| 2014/0008090 | A1 * | 1/2014 | Kokinelis ................. B25F 5/02 29/428 |
| 2014/0047913 | A1 | 2/2014 | Waite et al. |
| 2014/0100687 | A1 | 4/2014 | Ekstrom et al. |
| 2014/0321930 | A1 | 10/2014 | Dengler et al. |
| 2015/0097641 | A1 | 4/2015 | Chen |
| 2016/0012994 | A1 | 1/2016 | Boffelli et al. |
| 2016/0081267 | A1 | 3/2016 | Barendrecht |
| 2016/0221085 | A1 | 8/2016 | Zhong et al. |
| 2016/0318165 | A1 * | 11/2016 | Thorson ................ B25B 23/141 |
| 2016/0359392 | A1 | 12/2016 | Mergener et al. |
| 2017/0165824 | A1 | 6/2017 | Takeda |
| 2017/0266796 | A1 | 9/2017 | Leimbach et al. |
| 2018/0082805 | A1 | 3/2018 | Fangmann |
| 2018/0082808 | A1 | 3/2018 | Fangmann |
| 2018/0091145 | A1 | 3/2018 | Dey, IV et al. |
| 2018/0248446 | A1 | 8/2018 | Mergener et al. |
| 2019/0084144 | A1 * | 3/2019 | Nieh ......................... G01L 5/22 |
| 2019/0299795 | A1 | 10/2019 | Yan et al. |
| 2020/0043684 | A1 | 2/2020 | Olsson et al. |
| 2020/0245555 | A1 | 8/2020 | Colber et al. |
| 2021/0243946 | A1 | 8/2021 | Yang et al. |
| 2022/0134532 | A1 * | 5/2022 | Merget ................... H03K 17/97 173/1 |
| 2022/0254587 | A1 | 8/2022 | McCue et al. |

FOREIGN PATENT DOCUMENTS

| | | | | |
|---|---|---|---|---|
| CN | 106997821 | A | 8/2017 | |
| CN | 111756280 | A | 10/2020 | |
| DE | 9211412 | U1 | 12/1992 | |
| DE | 19825433 | A1 | 1/1999 | |
| DE | 19953204 | A1 | 5/2001 | |
| DE | 102007043035 | A1 | 3/2009 | |
| DE | 202011001836 | U1 * | 3/2011 | ........... B24B 55/102 |
| DE | 102013212573 | A1 | 12/2014 | |
| EP | 1788597 | B1 | 12/2008 | |
| EP | 2110830 | A2 | 10/2009 | |
| EP | 2682235 | A2 | 1/2014 | |
| EP | 2395527 | B1 | 3/2015 | |
| EP | 2946710 | B1 | 8/2017 | |
| EP | 3545744 | A1 | 10/2019 | |
| JP | 2006120466 | A | 5/2006 | |
| KR | 1020100080198 | A | 7/2010 | |
| WO | 2011151147 | A1 | 12/2011 | |
| WO | 2014031539 | A1 | 2/2014 | |

* cited by examiner

TRIGGER MECHANISM FOR POWER TOOL

CROSS-REFERENCE TO RELATED APPLICATIONS

This application claims priority to U.S. Provisional Patent Application No. 63/405,087 filed on Sep. 9, 2022, the entire contents of which are incorporated herein by reference.

FIELD OF THE INVENTION

The present disclosure relates to power tools, and more specifically, to trigger mechanisms for power tools.

BACKGROUND

Power tools may include a trigger for controlling operation of the power tool (e.g., energizing and de-energizing a motor of the power tool, controlling an operating speed of the motor, and the like). Typical power tool triggers require a large amount of space within a housing of the power tool to accommodate displacement of the trigger. In addition, because clearance between the housing and the trigger is required to accommodate displacement of the trigger, contaminants, such as water, dirt, or the like, may also enter the tool between the housing and the trigger.

SUMMARY

In one aspect, the disclosure provides a power tool including a housing, a motor, a controller, and a trigger mechanism. The housing includes a handle housing portion and a motor housing portion. The motor is supported within the motor housing portion. The controller is disposed in the housing and is configured to control operation of the motor. The trigger mechanism is coupled to the handle housing portion. The trigger mechanism includes a trigger contact body and a sensor configured to detect a force applied on the trigger contact body and transmit a signal to the controller to energize the motor.

The present disclosure provides, in another aspect, a power tool including a housing, a motor, trigger mechanism. The housing includes a handle housing portion and a motor housing portion. The motor is supported within the motor housing portion. The trigger mechanism is coupled to the handle housing portion. The trigger mechanism includes a trigger contact body that is actuatable to energize the motor. The trigger contact body is actuatable without moving the trigger contact body relative to the housing.

The present disclosure provides, in another aspect, a power tool including a housing, a motor, and a trigger mechanism. The housing includes a handle housing portion and a motor housing portion. The motor is supported within the motor housing portion. The trigger mechanism is coupled to the handle housing portion. The trigger mechanism includes a trigger contact body that is actuatable to energize the motor. The trigger contact body is fixed relative to the handle housing portion.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Referring generally to THE FIGURES the present disclosure provides a power tool including a trigger mechanism for controlling operation of the power tool (i.e. energizing a motor of the power tool and, optionally, controlling an operating speed of the motor). Trigger mechanisms embodying aspects of the present disclosure may be more compact than typical power tool trigger mechanisms, providing additional space within a housing of the power tool to accommodate other components (e.g., electronics, larger motors, etc.). Alternatively or additionally, the overall size of the housing of the power tool may be reduced.

Figure 1:
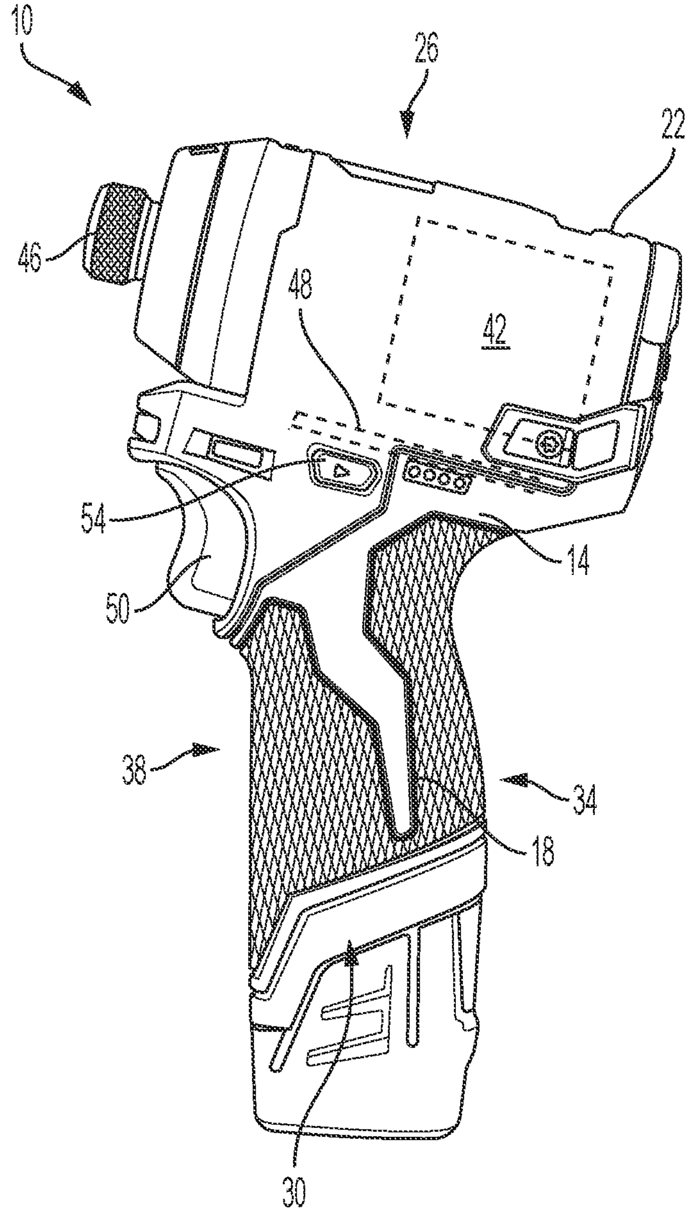
FIG. 1 is a side view of an exemplary power tool in which a trigger mechanism embodying aspects of the present disclosure may be incorporated.

For example, FIG. 1 illustrates a power tool 10 and, more particularly, a rotary power tool in the form of an impact driver. The power tool 10 includes a housing 14 having a handle housing portion 18, defining a handle of the power tool 10 configured to be grasped by a user during operation of the power tool 10, and a motor housing portion 22. With reference to the orientation of the power tool 10 illustrated in FIG. 1, the housing 14 includes a top side 26, a bottom side 30, a rear side 34, and a front side 38.

A motor 42 and a printed circuit board assembly (PCBA) 48 are supported within the motor housing portion 22. The motor 42 may drive a transmission to provide an output torque at a drive 46 of the power tool 10. In the illustrated embodiment, the power tool 10 is battery powered. The PCBA 48 may also be referred to as a controller. The controller 48 is configured to control operation of the motor 42 and may include, among other electrical/electronic components, a programmable microprocessor, non-transitory, machine-readable memory, and switches (e.g., MOSFETs, IGBTs, or the like) for distributing electrical power from the battery to the motor 42.

In the illustrated embodiment, the drive 46 extends from the front side 38 of the housing 14 and may receive a tool element (e.g., a bit, socket, or the like) for performing work on a workpiece. A trigger mechanism 50 is attached to the handle housing portion 18 on the front side 38 of the housing 14 and may be actuated to energize, and optionally control an operating speed of, the motor 42. The power tool 10 further includes a rotation direction switch 54 that enables a user to switch a rotation direction of the motor 42, and thus, the drive 46.

Figure 2:
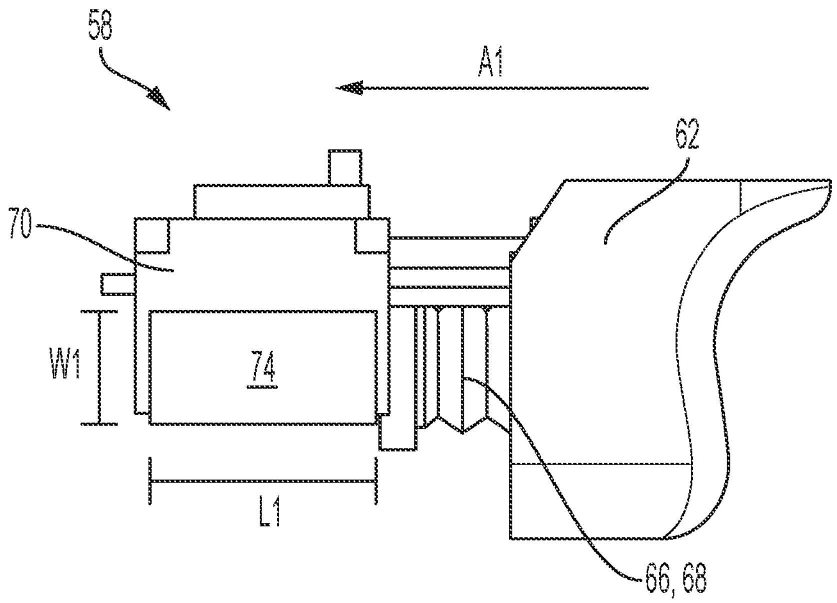
FIG. 2 PRIOR ART
FIG. 2 is a side view of a prior art trigger mechanism.
Figure 3:
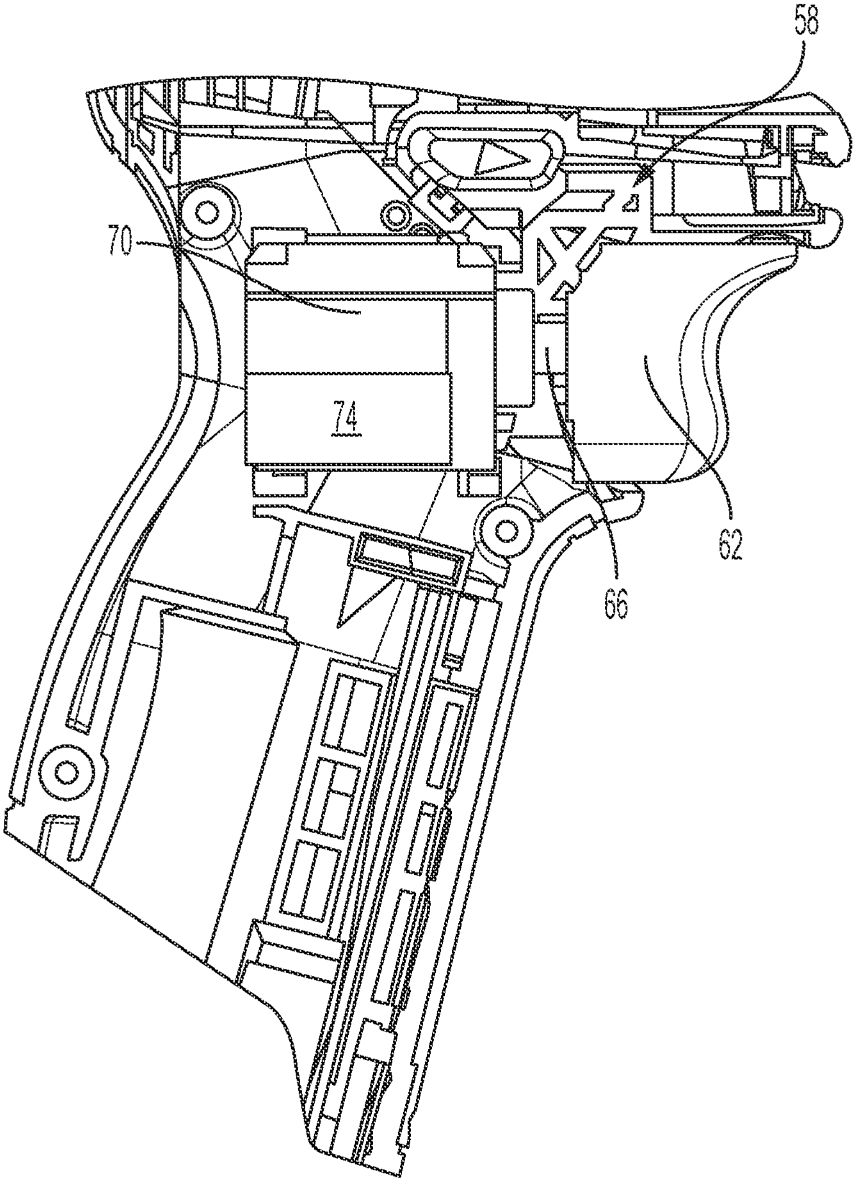
FIG. 3 PRIOR ART
FIG. 3 illustrates the prior art trigger mechanism of FIG. 2 installed on the handle portion of an exemplary power tool.

FIGS. 2 and 3 illustrate a prior art trigger mechanism 58. The prior art trigger mechanism 58 includes a trigger contact body 62, a plunger 66, and a trigger control body 70. The trigger control body 70 is located a distance away from the trigger contact body 62. A user may displace the trigger contact body 62 toward the trigger control body 70 to actuate the trigger mechanism 58. More specifically, the trigger contact body 62 is coupled to the plunger 66 such that the trigger contact body 62 and plunger 66 are displaceable together along an actuating direction A1, against the biasing force of a spring 68. Movement of the plunger 66 into the trigger control body 70 produces an actuating signal via a PCB 74 coupled to the trigger control body 70. The PCB 74 in the trigger control body 70 then relays the actuating signal, either directly to a motor or to a controller, which receives the actuating signal as a logic-level input and then delivers current to the motor based on the logic-level input.

The PCB 74 located in the trigger control body 70 is generally rectangular such that the PCB 74 has a length L1 and a width W1. The length L1 is greater, or longer, than the width W1. The PCB 74 is oriented such that the length L1 extends parallel to the actuating direction A1 of the plunger 66, and the width W1 extends perpendicular to the actuating direction A1 of the plunger 66.

Figure 4:
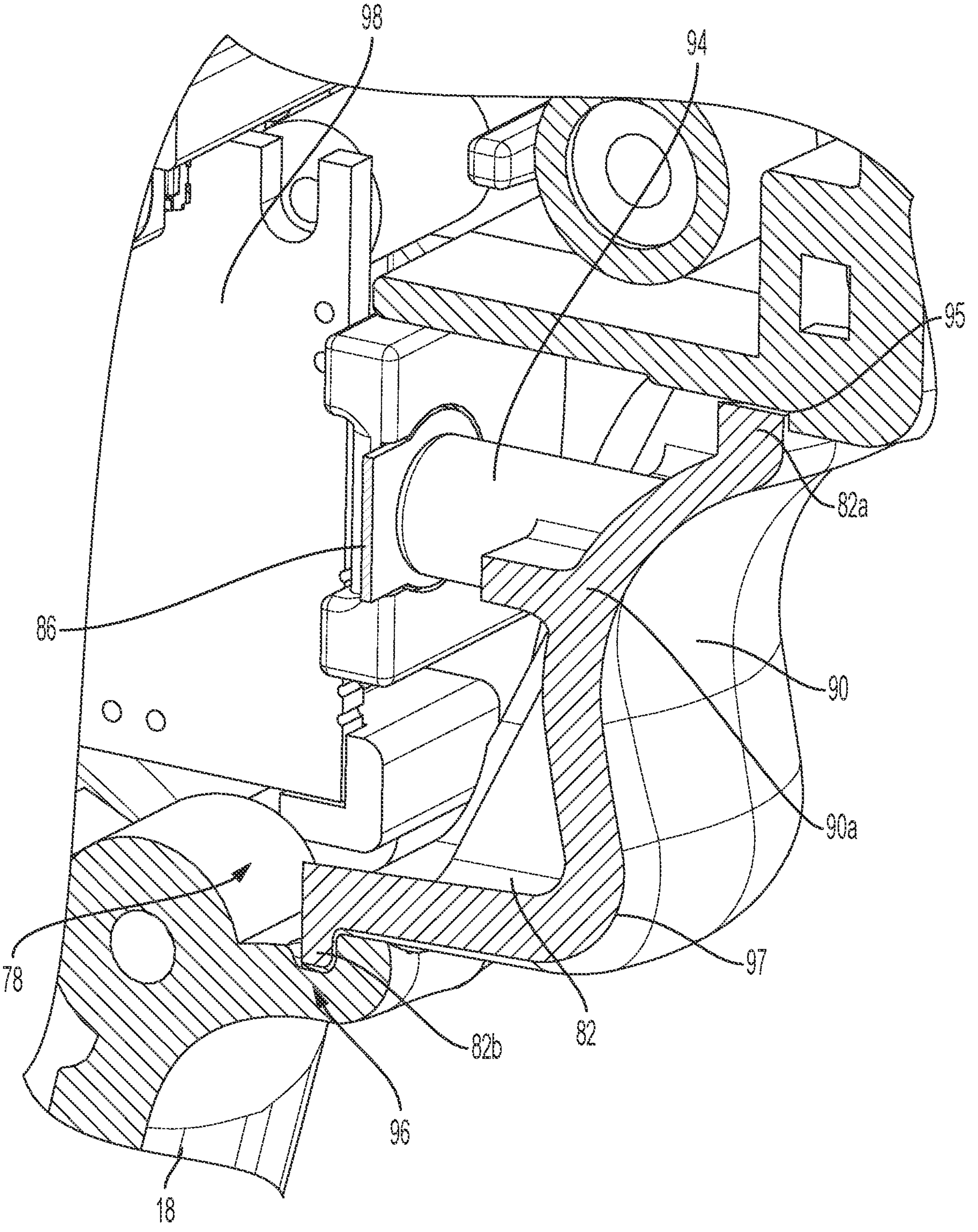
FIG. 4 is a cross-sectional view illustrating a trigger mechanism according to an embodiment of the present disclosure.
Figure 5:
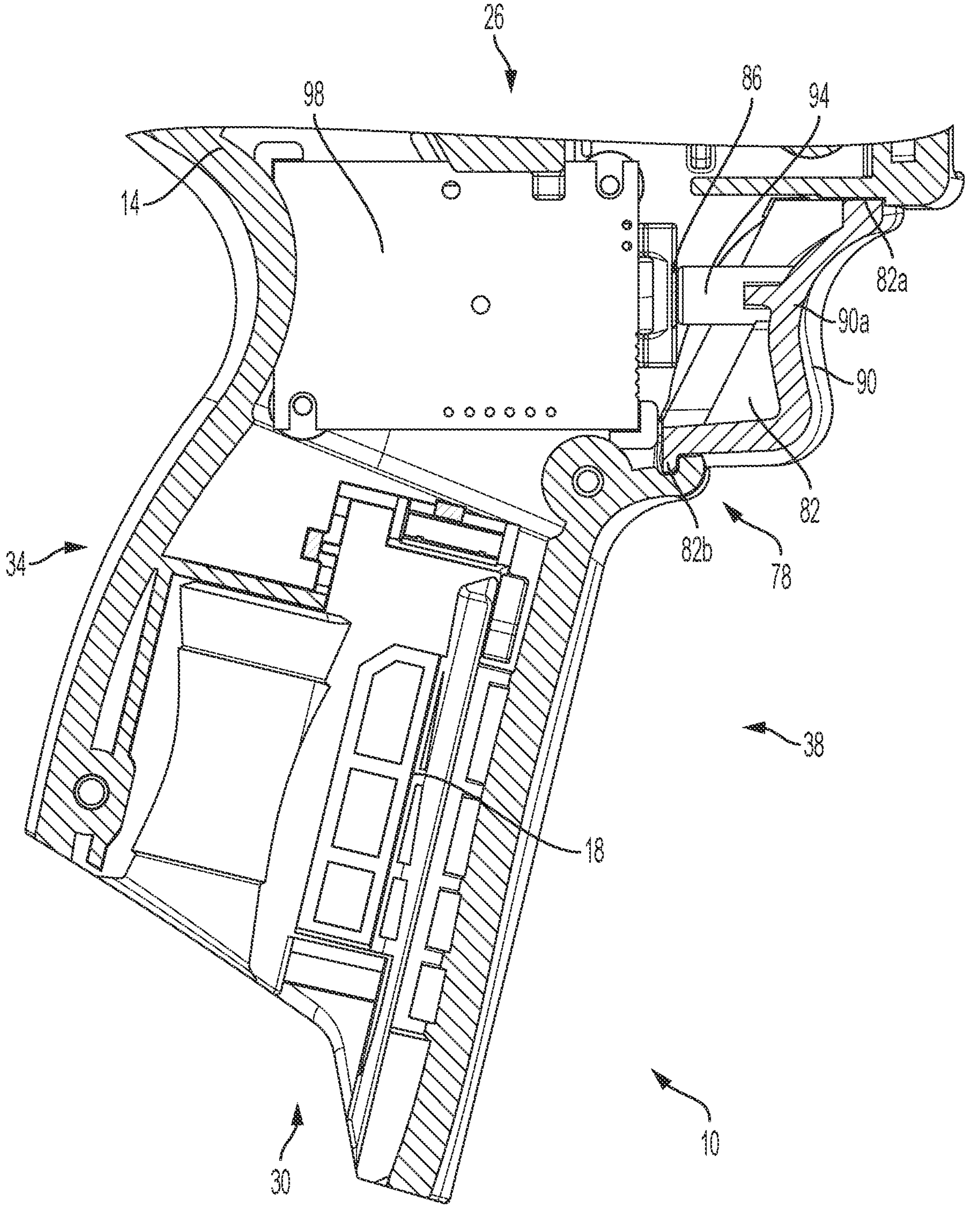
FIG. 5 is a cross-sectional view illustrating the trigger mechanism of FIG. 4 installed on a handle portion of a power tool.

FIGS. 4 and 5 illustrate a trigger mechanism 78 according to an embodiment of the disclosure. The trigger mechanism 78 may be coupled, or installed, for example, at the front side 38 of the handle housing portion 18 of the power tool 10 of FIG. 1 (i.e., as the trigger mechanism 50). The trigger mechanism 78 includes a trigger contact body 82 and a sensor 86. The trigger contact body 82 includes an arcuate surface 90 that is shaped for the finger of a user to engage the trigger contact body 82. In the illustrated embodiment, the sensor 86 is a force sensing resistor (FSR). As such, the sensor 86 is configured to detect user engagement with the trigger contact body 82. For example, the sensor 86 may detect physical pressure, squeezing and/or weight on the arcuate surface 90 of the trigger contact body 82. In other embodiments, the sensor 86 may be a micro electro-mechanical system (MEMS) sensor, or another similar type of sensor that is configured to detect a force applied to the trigger contact body 82.

The trigger contact body 82 is captured between two housing halves (e.g., clamshell halves), although only one housing half is illustrated in FIGS. 4 and 5. Specifically, the trigger contact body 82 is press-fit between the two housing halves of the handle housing portion 18. The trigger contact body 82 includes a first end 82*a* and a second end 82*b*. The first end 82*a* is positioned relatively closer to the top side 26 of the power tool 10 (FIG. 1) than the second end 82*b*. That is, the first end 82*a* is positioned between the top side 26 of the power tool 10 (FIG. 1) and the second end 82*b* of the power tool 10. The first end 82*a* is press-fit with a ridge 95 in the handle housing portion 18 that inhibits the trigger contact body 82 from moving forward relative to the handle housing portion 18. The second end 82*b* is press-fit in a groove 96 formed in the handle housing portion 18 that inhibits the trigger contact body 82 from moving forward and rearward relative to the handle housing portion 18. A rounded protruding edge 97 is positioned forward of the second end 82*b* of the handle housing portion 18. The arcuate surface 90 extends between the first end 82*a* and the rounded protruding edge 97. Specifically, the arcuate surface 90 extends inwardly (e.g., toward the rearward side 34 of the power tool 10) from both the first end 82*a* and the rounded protruding edge 97 to an inner-most portion 90*a*. As such, the arcuate surface 90 of the trigger contact body 82 is shaped to direct a user's finger to the inner-most portion 90*a*. The trigger contact body 82 includes a projection 94 formed at the inner-most portion 90*a* and extending toward the sensor 86. The projection 94 is configured to concentrate forces applied at the arcuate surface 90 on the sensor 86.

With reference to FIGS. 4 and 5, the sensor 86 is electrically connected to a trigger printed circuit board assembly (PCBA) 98 positioned in the handle housing portion 18 of the housing 14 of the power tool 10. The trigger PCBA 98 may also be referred to as a trigger controller 98. The sensor 86 is configured to transmit a signal to the trigger PCBA 98 when the trigger mechanism 78 is actuated through, for example, squeezing the trigger contact body 82. After the trigger PCBA 98 receives the signal from the sensor 86, the trigger PCBA 98 may send a signal to the controller 48 to energize the motor 42 (FIG. 1) so that the power tool 10 may perform a working operation such as, for example, screwdriving. In some embodiments, the trigger PCBA 98 and the controller 48 may be embodied as a single PCBA.

In some embodiments, with reference to FIGS. 1 and 5, the sensor 86 may produce a signal received by the controller 48, which may then energize the motor 42 by determining from the signal if the force on the trigger contact body 82 exceeds a predetermined threshold force. As such, the controller 48 may not energize the motor 42 unless the signal received from the sensor 86 is above a threshold force. The controller 48 may then de-energize the motor 42 when the force on the trigger contact body 82 drops below the predetermined threshold force. In some embodiments, the trigger mechanism 78 may include a trigger lock for inhibiting unintended or accidental actuation of the trigger mechanism 78. In some embodiments, the controller 48 is configured to vary an operating speed of the motor 42 based, at least in part, on feedback from the sensor 86. That is, the sensor 86 is configured to detect a magnitude of the force applied on the trigger contact body 82 and is configured transmit a signal to the controller 48 to energize the motor 42 to rotate at a speed corresponding to the magnitude of the force. For example, as a user applies relatively more force on the trigger contact body 82, the controller 48 is configured to increase the operating speed of the motor 42. As a user applies relatively less force on the trigger contact body 82, the controller 48 is configured to decrease the operating speed of the motor 42.

The FSR sensor 86 enables a reduction in size of the trigger mechanism 78. Specifically, the sensor 86 in the illustrated embodiment of FIGS. 4 and 5 enables the trigger mechanism 78 to function without including a trigger control body, such as the trigger control body 70 (FIG. 3), or a plunger, such as the plunger 66 (FIG. 3). As such, by removing these components, the sensor 86 enables the reduction in size of the trigger mechanism 78 compared to the prior art trigger mechanism 58 of FIGS. 2 and 3. With reduced space requirements, the trigger mechanism 78 may also advantageously be placed at various other locations on the power tool 10 (e.g., on an auxiliary handle (not shown), on a rear end of the tool, etc.). In some embodiments, the power tool 10 may include multiple trigger mechanisms 78.

The FSR sensor 86 also enables an improved, or longer, lifespan of the trigger mechanism 78. Specifically, the FSR sensor 86 enables the trigger mechanism 78 to be actuated without physically moving the trigger contact body 82 to actuate the motor 42 (FIG. 1). That is, the trigger contact body 82 does not need to be translated into the handle housing portion 18 or rotated relative to the handle housing portion 18 to actuate the motor 42 (FIG. 1). As such, because movement of the trigger contact body 82 is not required to actuate the trigger mechanism 78, wear on the trigger mechanism 78 over the lifespan of the power tool 10 is minimized. Additionally, the FSR sensor 86 enables the press-fit between the trigger contact body 82 and the handle housing portion 18 because the trigger contact body 82 does not need to be moved for actuation. As such, the press-fit inhibits environmental ingress from entering the housing 14 of the power tool 10, thereby further improving the lifespan of the power tool 10. In some embodiments, the trigger mechanism 78 may include a seal for inhibiting environmental ingress from entering the handle housing portion 18 that extends along a periphery of the trigger contact body 82 between the trigger contact body 82 and the handle housing portion 18.

In some embodiments, the trigger mechanism 78 may be configured to permit travel of the trigger contact body 82 to provide a tactile feeling similar to a typical trigger mechanism. In such embodiments, a spring may be positioned between the trigger contact body 82 and the sensor 86. Thus, when the trigger contact body 82 is moved towards the sensor 86, the spring will compress and exert a corresponding force measured by the sensor 86.

Figure 6:
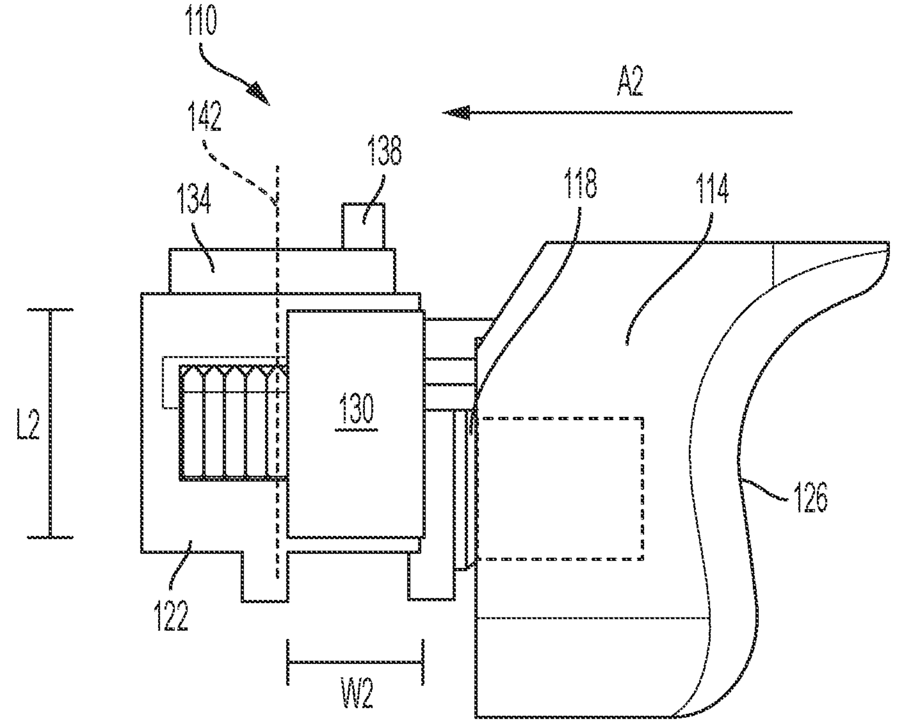
FIG. 6 is a side view of a trigger mechanism according to another embodiment of the disclosure.
Figure 7:
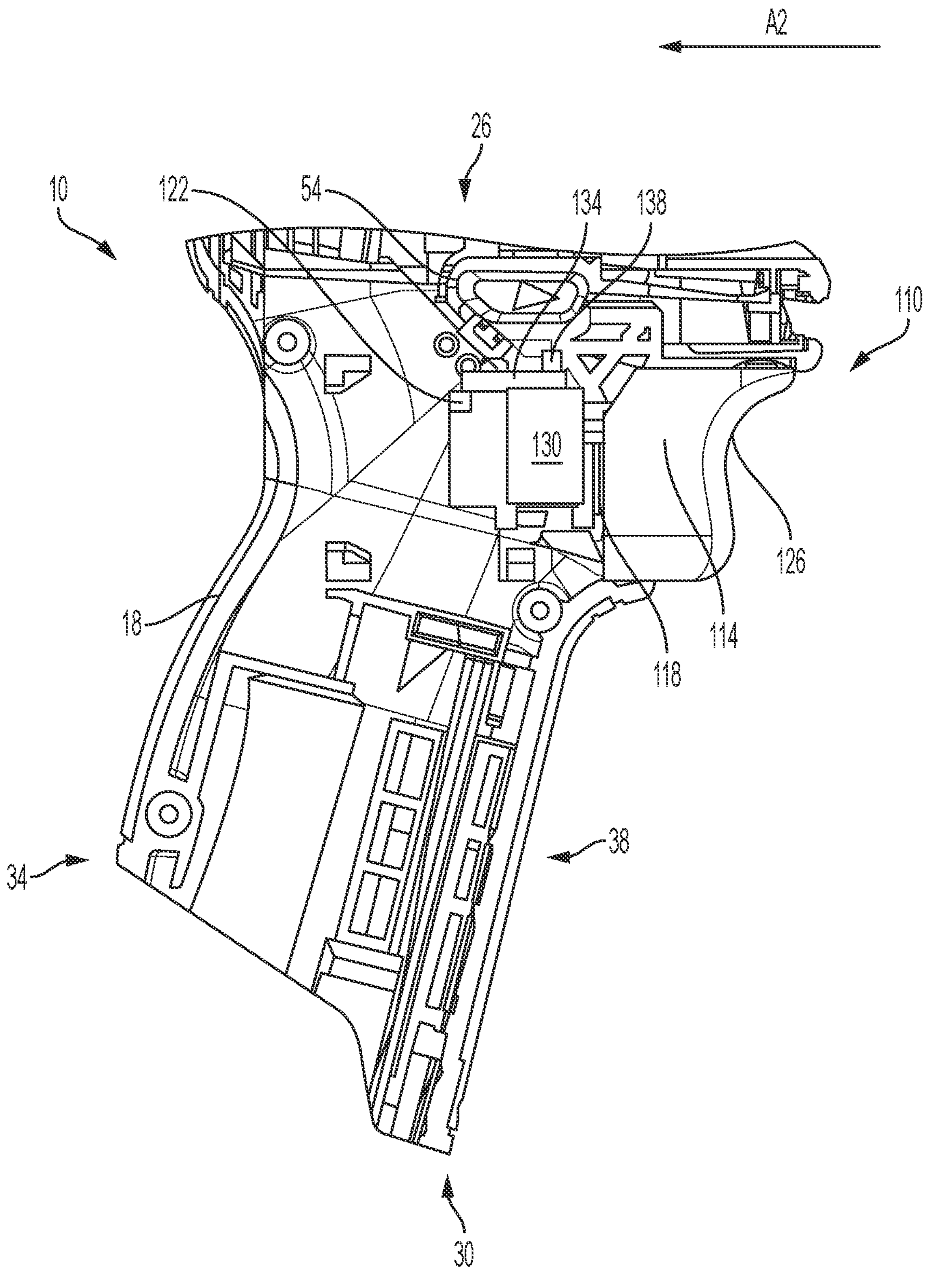
FIG. 7 illustrates the trigger mechanism of FIG. 6 installed on a handle portion of a power tool.

FIGS. 6 and 7 illustrate a trigger mechanism 110 according to an embodiment of the disclosure. The trigger mechanism 110 may be installed at the front side 38 of the handle housing portion 18 of the power tool 10. The illustrated trigger mechanism 110 includes a trigger contact body 114, a plunger 118, and a trigger control body 122. The trigger contact body 114 includes an arcuate surface 126 that is shaped for the finger of a user to ergonomically engage the trigger contact body 114. The plunger 118 is operably positioned between the trigger contact body 114 and the trigger control body 122. The trigger control body 122 is positioned relatively closer to the trigger contact body 114 than the trigger control body 70 of the prior art trigger mechanism 58 (FIGS. 2-3), and in some embodiments, the trigger control body 122 may be partially received within a recess defined by the trigger contact body 114. The plunger 118 also extends a greater distance into the trigger contact body 114, which reduces the overall length of the trigger mechanism 110 compared to the trigger mechanism 58.

A user may displace (e.g., slide) the trigger contact body 114 to actuate the trigger mechanism 78, and thus, energize and optionally control an operating speed of the motor 42 of the power tool 10 of FIG. 1. By compressing the trigger contact body 114, the trigger contact body 114 compresses, or translates, the plunger 118 along an actuating direction A2. Movement of the plunger 118 produces an actuating signal via a PCB 130 coupled to the trigger control body 122. The PCB 130 in the trigger control body 122 then relays the actuating signal, either directly to a motor (such as the motor 42 of FIG. 1) or to a main control board (not shown), which receives the actuating signal as a logic-level input and then delivers current to the motor based on the logic-level input.

Referring to FIG. 6, the illustrated PCB 130 is generally rectangular such that the PCB 130 has a length L2 and a width W2. The length L2 is greater, or longer, than the width W2. The PCB 130 is oriented such that the length L2 extends perpendicular to the actuating direction A2 of the plunger 118 and the width W2 extends parallel to the actuating direction A2 of the plunger 118. As such, with reference to FIG. 7, the trigger mechanism 110 in the illustrated embodiment does not extend as far from the front side 38 toward the rear side 34 of the power tool 10 (as compared to the trigger mechanism 58 of FIG. 3). In other words, the trigger mechanism 110 in the illustrated embodiment of FIG. 7 takes up less space within the handle housing portion 18 of the power tool 10 than the prior art trigger mechanism 58 illustrated in FIG. 3. For example, in some embodiments, the trigger mechanism 110 takes up 16% less volume within the handle housing portion 18 than the prior art trigger mechanism 58. This advantageously allows for additional space within the handle housing portion 18 for larger electronics, improved cooling airflow, etc., and/or a reduction in the overall size of the handle housing portion 18.

The illustrated trigger control body 122 also includes a shuttle 134 that is positioned in engagement with the rotation direction switch 54 of the power tool 10. In the illustrated embodiment, the shuttle 134 includes a knob 138 extending away from the trigger control body 122. A user may move the rotation direction switch 54 to set a rotation direction of the motor 42 of the power tool 10 in a forward rotation direction (in a first position of the switch 54), in a reverse rotation direction (in a second position of the switch 54), and optionally in a neutral or locked state (in an intermediate position of the switch 54 between the first and second positions), in which operation of the motor 42 is disabled. By actuating the rotation direction switch 54, the user moves (e.g., pivots) the shuttle 134. In the illustrated embodiment, the shuttle 134 is pivotable about an axis 142 that is parallel to the length L2 of the PCB 130 and perpendicular to the actuating direction A2 of the plunger 118. The shuttle 134 is operatively coupled to the PCB 130 to produce a direction control signal that ultimately controls the direction of rotation of the motor 42.

Figure 8:
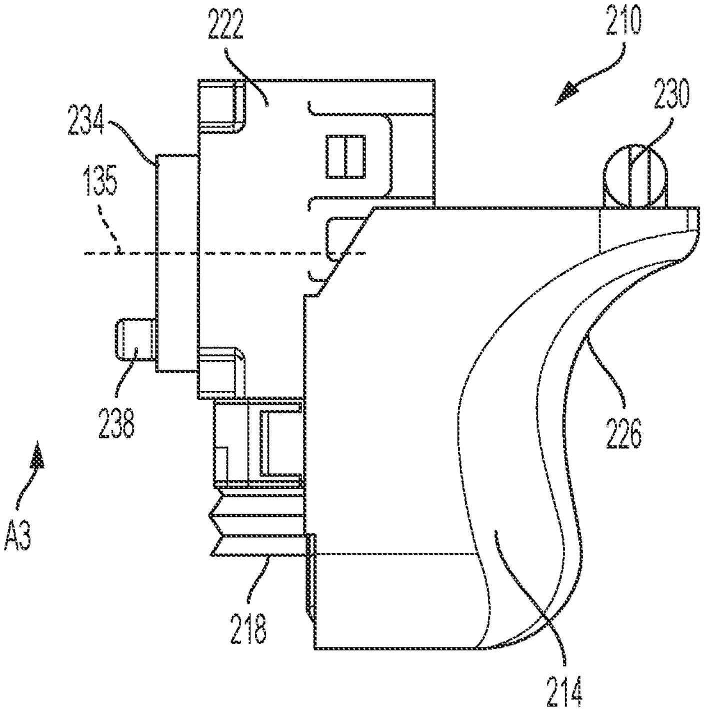
FIG. 8 is a side view of a trigger mechanism according to another embodiment of the disclosure.
Figure 9:
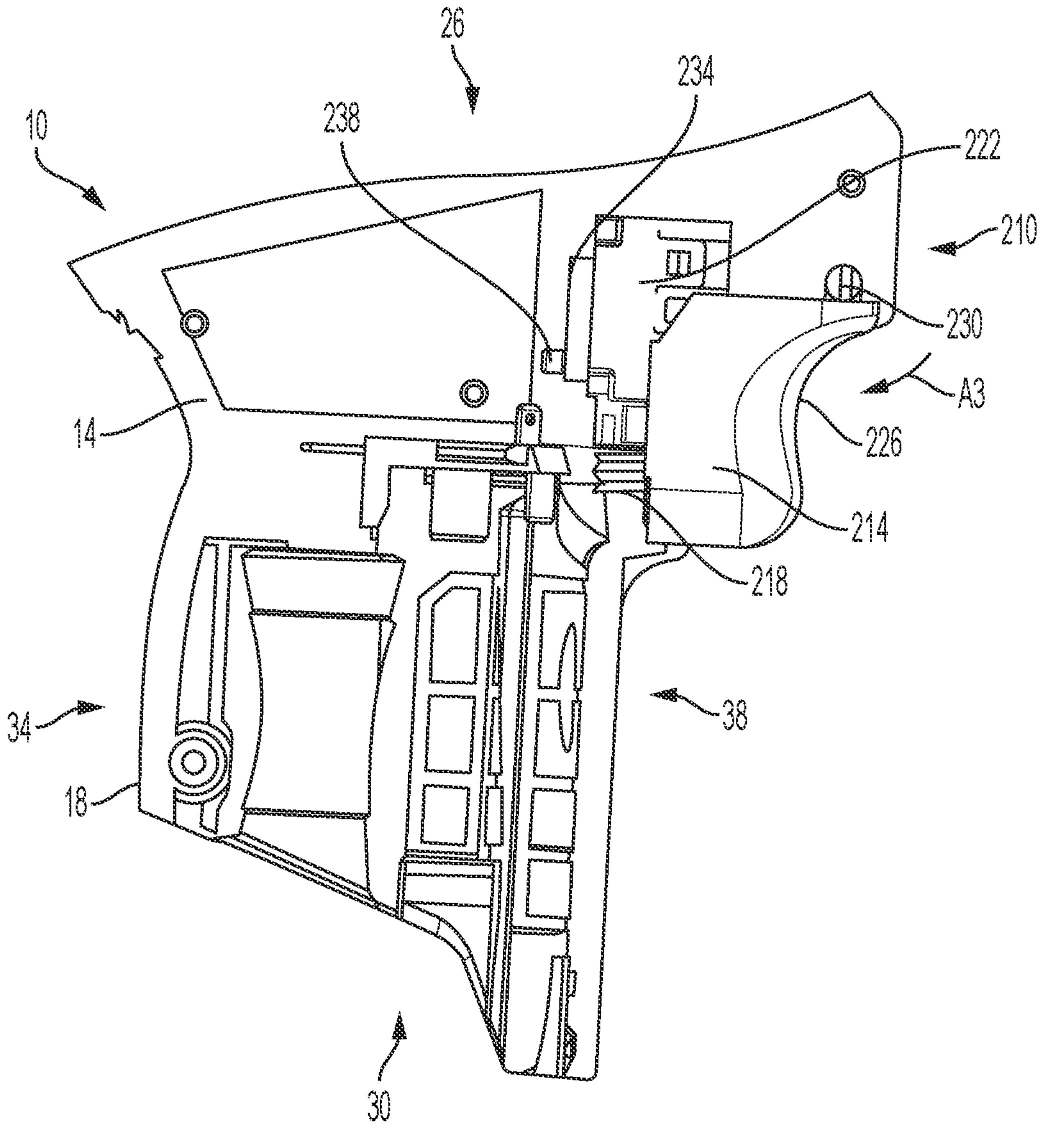
FIG. 9 illustrates the trigger mechanism of FIG. 8 installed on a handle portion of a power tool.

FIGS. 8 and 9 illustrate a trigger mechanism 210 according to another embodiment of the disclosure. The trigger mechanism 210 may be installed at the front side 38 of the handle housing portion 18 of the power tool 10. The trigger mechanism 210 includes a trigger contact body 214, a plunger 218, and a trigger control body 222. The trigger contact body 214 includes an arcuate surface 226 that is shaped for the finger of a user to ergonomically engage the trigger contact body 214. As illustrated in FIG. 8, the plunger 218 is oriented vertically with respect to the power tool 10. As such, the plunger 218 in the illustrated embodiment of FIG. 7 is oriented generally perpendicular relative to the plunger 118 in the embodiment of FIG. 5.

The trigger contact body 214 additionally includes a pivot pin 230 that extends through the housing 14 of the power tool 10. As such, actuation of the trigger mechanism 210 in the illustrated embodiment of FIG. 9 pivots the trigger contact body 214 about the pivot pin 230. Pivoting the trigger contact body 214 about the pivot pin 230 moves the vertically oriented plunger 218 along an actuating direction A3. For example, in some embodiments, the interior of the trigger contact body 214 may include a cam surface that slides against the plunger 218 to move the plunger 218 in the actuating direction A3 when the trigger contact body 214 pivots about the pivot pin 230. In other embodiments, the trigger contact body 214 may be coupled to the plunger 218 by a linkage or other suitable arrangement for translating pivotal movement of the trigger contact body 214 to linear movement of the plunger 218. Moving the plunger 218 along the actuating direction A3 produces an actuating signal via a PCB (not shown) disposed within the trigger control body 222.

The orientation of the plunger 218 and the trigger control body 222 enables the trigger control body 222 to be at least partially recessed in the trigger contact body 214. As such, the trigger mechanism 210 in the illustrated embodiment of FIG. 9 does not extend as far from the front side 38 toward the rear side 34 of the power tool 10 as the trigger mechanism 58 of FIG. 3. In other words, the trigger mechanism 210 in the illustrated embodiment of FIG. 9 takes up less space within the handle housing portion 18 of the power tool 10 than the prior art trigger mechanism 58 illustrated in FIG. 3.

The trigger control body 222 additionally includes a shuttle 234 that is substantially similar to the shuttle 134 of FIG. 7 except that the shuttle 234 extends along a rear side of the trigger control body 222. The shuttle 234 includes a knob 238 extending away from the trigger control body 222, and the shuttle 234 is pivotable about an axis 242 oriented perpendicular to the actuating direction A3.

Thus, the present disclosure provides trigger mechanisms that improve upon existing power tool trigger mechanisms in various ways. Although the trigger mechanisms 58, 78, 110, 210 have been described above with compatibility to certain power tools 10, any of the trigger mechanisms 58, 78, 110, 210 may be installed on other types of power tools or other devices utilizing a trigger actuator to actuate a motor.

Although the disclosure has been described in detail with reference to certain preferred embodiments, variations and modifications exist within the scope and spirit of one or more independent aspects of the disclosure as described.

Various features and aspects of the present disclosure are set forth in the following claims.

What is claimed is:

1. A power tool comprising:
- a housing including a handle housing portion and a motor housing portion;
- a motor supported within the motor housing portion;
- a controller disposed in the housing and configured to control operation of the motor;
- a trigger mechanism coupled to the handle housing portion, the trigger mechanism including a trigger contact body and a sensor configured to detect a force applied on the trigger contact body and transmit a signal to the controller to energize the motor; and
- a lock mechanism that inhibits unintended actuation of the trigger contact body, wherein the sensor includes a force sensing resistor.

2. The power tool of claim 1, wherein the sensor is configured to detect a magnitude of the force applied on the trigger contact body and is configured to transmit the signal to the controller to energize the motor such that the motor rotates at a speed corresponding to the magnitude of the force.

3. The power tool of claim 1, wherein the trigger mechanism includes a trigger controller in electrical communication with the controller disposed in the housing such that the trigger controller is configured to receive the signal from the sensor and transmit the signal to the controller to energize the motor.

4. The power tool of claim 1, wherein the trigger mechanism includes a projection extending between the trigger contact body and the sensor, the projection configured to concentrate the force applied on the trigger contact body on the sensor.

5. The power tool of claim 4, wherein the trigger contact body includes an arcuate surface configured to be engaged by a user's finger, and wherein the projection extends from an inner-most portion of the arcuate surface.

6. The power tool of claim 1, wherein the handle housing portion inhibits the trigger contact body from moving relative to the handle housing portion in response to the force applied on the trigger contact body.

7. The power tool of claim 1, wherein the controller does not energize the motor unless the signal transmitted by the sensor indicates that the force applied on the trigger contact body is above a threshold force.

8. The power tool of claim 1, further comprising a spring positioned between the trigger contact body and the sensor, wherein the force applied on the trigger contact body is transmitted to the sensor through the spring.

9. A power tool comprising:
- a housing including a handle housing portion and a motor housing portion;
- a motor supported within the motor housing portion;
- a trigger mechanism coupled to the handle housing portion, the trigger mechanism including a trigger contact body that is actuatable to energize the motor, the trigger contact body being actuatable without moving the trigger contact body relative to the housing;
- a sensor configured to detect application of a force on the trigger contact body, wherein the sensor is configured to transmit a signal to the motor to energize the motor upon detection of the application of the force on the trigger contact body; and
- a projection extending between the trigger contact body and the sensor, the projection configured to concentrate the force applied on the trigger contact body on the sensor.

10. The power tool of claim 9, wherein the handle housing portion inhibits movement of the trigger contact body relative to the housing.

11. The power tool of claim 10, wherein the trigger contact body is press-fit to the handle housing portion such that the press-fit between the trigger contact body and the handle housing portion inhibits environmental ingress from entering the handle housing portion.

12. The power tool of claim 9, wherein the trigger contact body is actuatable through application of the force on the trigger contact body, and wherein the application of the force on the trigger contact body does not move the trigger contact body relative to the handle housing portion.

13. The power tool of claim 9, wherein the sensor includes a force sensing resistor.

14. The power tool of claim 9, wherein the sensor includes a micro electro-mechanical system.

15. A power tool comprising:
- a housing including a handle housing portion and a motor housing portion;
- a motor supported within the motor housing portion;
- a trigger mechanism coupled to the handle housing portion, the trigger mechanism including a trigger contact body that is actuatable to energize the motor, the trigger contact body being fixed relative to the handle housing portion; and
- a lock mechanism that inhibits unintended actuation of the trigger contact body,
- wherein the trigger mechanism includes a sensor configured to detect application of a force on the trigger contact body and to transmit a signal to the motor to energize the motor upon detection of the application of the force on the trigger contact body, and
- wherein the sensor includes a micro electro-mechanical system.

16. The power tool of claim 15, wherein the handle housing portion is formed of two handle halves, and wherein at least a portion of the trigger contact body is captured between the handle halves.

17. The power tool of claim 16, wherein the trigger contact body is press-fit between the handle halves.

18. The power tool of claim 15, wherein the handle housing portion inhibits movement of the trigger contact body relative to the housing while the force is applied to the trigger contact body.

19. The power tool of claim 15, wherein the trigger mechanism further includes a seal positioned between the trigger contact body and the handle housing portion that inhibits environmental ingress from entering the handle housing portion.

* * * * *